March 28, 1939.   H. D. HARPER   2,151,966

APPARATUS FOR MAKING INFUSIONS

Filed Jan. 18, 1937   3 Sheets-Sheet 1

Inventor:
Harry Dorr Harper.
By Whiteley and Ruckman
Attorneys.

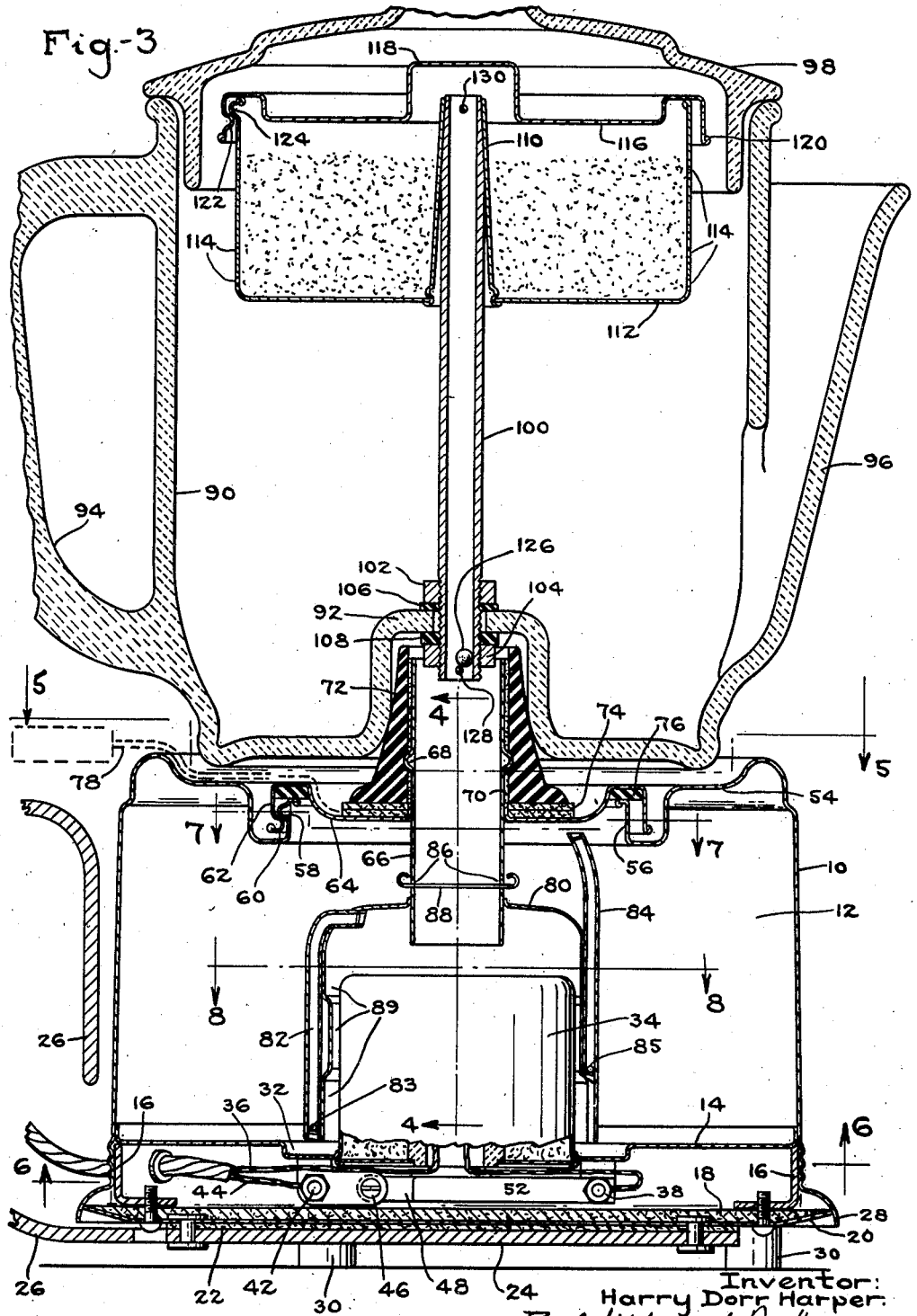

March 28, 1939.  H. D. HARPER  2,151,966
APPARATUS FOR MAKING INFUSIONS
Filed Jan. 18, 1937  3 Sheets-Sheet 3
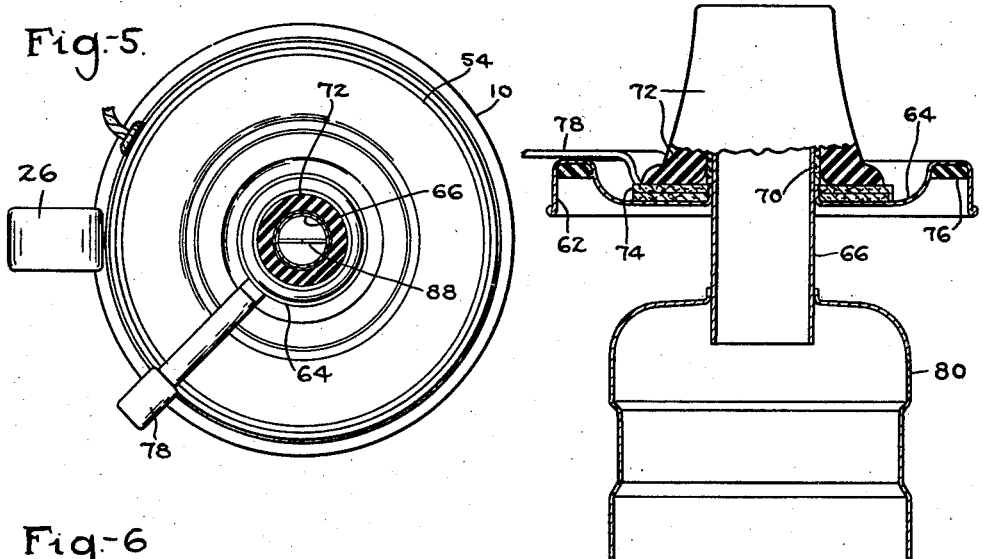
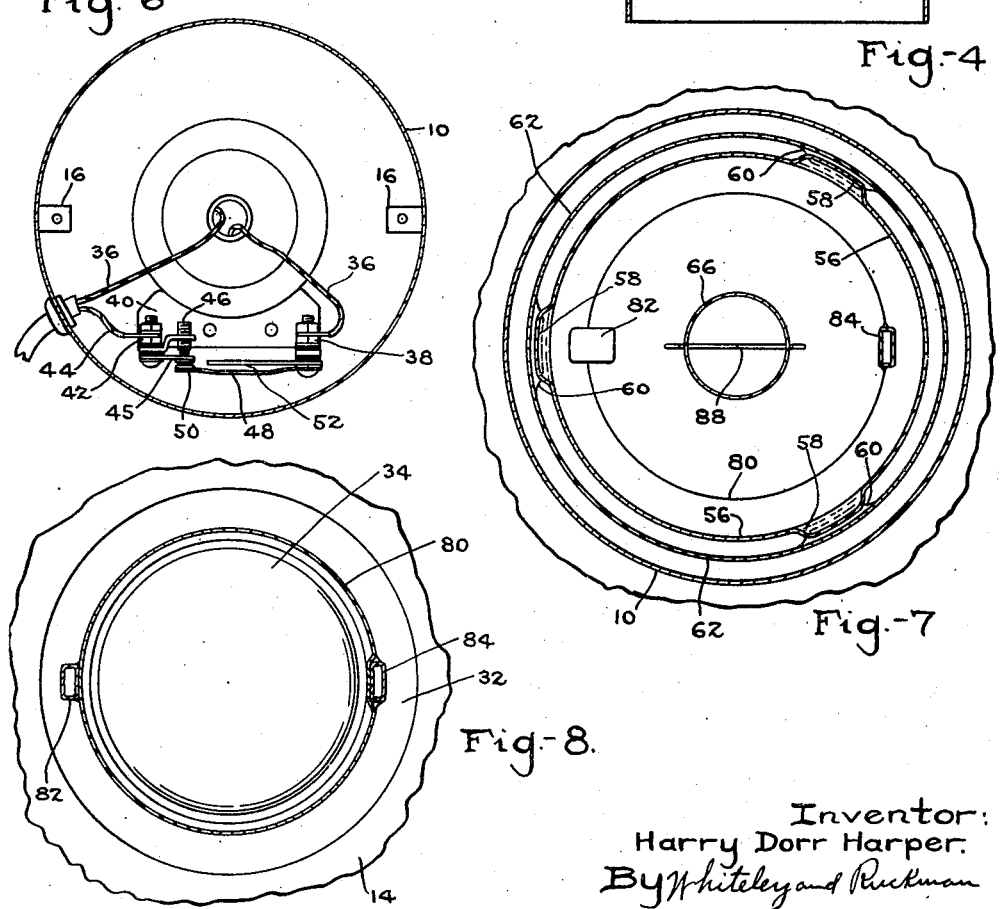
Inventor:
Harry Dorr Harper.
By Whiteley and Ruckman
Attorneys.

Patented Mar. 28, 1939

2,151,966

UNITED STATES PATENT OFFICE 2,151,966

APPARATUS FOR MAKING INFUSIONS

Harry Dorr Harper, Minneapolis, Minn., assignor to Margaret Kruse Harper, Minneapolis, Minn.

Application January 18, 1937, Serial No. 121,224

16 Claims. (Cl. 53—3)

My invention relates to apparatus for making infusions and is in the nature of an improvement over the disclosure in my application, Serial Number 743,427, filed September 10, 1934, which matured into Patent No. 2,067,918, dated Jan. 19, 1937. The invention relates particularly to apparatus for making coffee infusions, tea infusions and other infusions. Among the objects of the invention are the provision of apparatus of this character which is of compact arrangement, simple in construction, easy to use or operate, economical in manufacture, and particularly adapted to small eating places, and for household use.

Another object of the invention is to provide an infusing receptacle for the material to be infused such as ground coffee or tea, so that when the infusing liquid, as for example water at correct temperature, is introduced into said receptacle, the infusing liquid not only passes through all of the material to be infused, but causes a decided agitating or rotating movement of the material, in order that such material may be subjected to the greatest action of the infusing liquid in the time required to make the infusion.

Another object of the invention is to provide a beverage receptacle for the completed infusion, such as coffee beverage and means for having the infusing receptacle so located in reference to the "beverage receptacle" that the infusion as it is delivered from the infusing receptacle is received and held, ready for dispensing in the "beverage receptacle".

Another object of the invention is to provide a means of so attaching the "beverage receptacle" to a heating chamber, that the liquid in said chamber is caused to flow through a connecting tube to the infusing receptacle, and means for easily removing the beverage receptacle from the heating chamber for the purpose of dispensing the liquid beverage.

Another object of the invention is to provide a receptacle (heating chamber) for the holding and heating of the infusing liquid and means for easily introducing or removing the infusing liquid from said chamber.

Another object of said invention is to heat the infusing liquid in the heating chamber and cause it to be delivered to the infusing receptacle, at the correct temperature for making the infusion, and at the proper rate of flow for such liquid in order to extract the greatest amount of the desirable ingredients of the material to be infused.

Another object of the invention is to so arrange the heating means that as the infusing liquid is being delivered to the infusing receptacle, it is caused to be heated to the correct temperature for making the infusion, whether at below the boiling temperature of the infusing liquid or at such boiling temperature together with steam or vapor above the boiling temperature of the liquid.

Another object of the invention is to so arrange the heating means and attachments and the means for transferring the infusing liquid to the infusing receptacle, that irrespective of the quantity of the infusing liquid used at any given time, said infusing liquid will be delivered at the correct temperature for making the infusion, and in relatively the same period of time as if a maximum quantity of the infusing liquid were used. This object is to eliminate any adjustments for varying quantities, which is automatically accomplished, securing substantially the same chemical and commercial results in making a small or maximum quantity of the desired beverage.

Another object of the invention is to so control the vapor or steam pressure on the top surface of the infusing liquid in the heating chamber as to cause the infusing liquid to move past the heating means at a rate which will enable the heating means to bring the infusing liquid to desired infusing temperature as it is being delivered to the infusing receptacle.

Another object of the invention is to have the heating means so constructed and positioned in relation to the infusing liquid that in using a small quantity of the infusing liquid, the heating means causes small quantities of the liquid to become converted into steam, creating a vapor or steam pressure (in a portion of the area in which the liquid passes as it is being heated) which pressure causes the flow of the liquid by the normal vapor pressure on the top surface of the liquid to be interrupted and retarded, necessitating the vapor pressure to be relatively increased on the top surface of the liquid, and resulting in a longer period of time for the small quantity of infusing liquid to be delivered to the infusing receptacle.

Another object of the invention is to increase or decrease the vapor pressure on the top surface of the infusing liquid in the heating chamber independent of the temperature of the mass of infusing liquid as a whole in order to accelerate or decrease the rate of flow of the infusing liquid as it passes over the heating means.

Another object of the invention is to so control the heating means that after a sufficient amount of heat has been applied to cause all of the infusing liquid to be transferred to the infusing receptacle at correct infusing temperature, that such heating means is made inactive by restricting or eliminating the source of heat as supplied to said heating means.

Another object of the invention is to maintain the temperature of the heating chamber after the infusing liquid has all been transferred to the infusing receptacle and beverage receptacle, at a sufficient temperature so that when the beverage receptacle is in contact with the heating chamber, heat from the heating chamber will maintain the beverage at a correct serving temperature.

While intended more particularly for making coffee infusions and tea infusions, it is to be understood that my apparatus is well adapted for making of infusions of other material, such as extracts of various herbs used for beverage, medicinal or other purposes.

In considering the operation of my apparatus, particularly for the making of coffee, it is necessary to understand what factors must be taken into consideration in the making of the most approved cup of coffee, and also wherein the method used in my apparatus differs from other methods now used in homes and commercially.

One of the most important factors is temperature of the water as it contacts the coffee. Another is period of time that the water is in contact with the ground coffee and the relative proportion of the water in contact with the ground coffee during the total contact period.

When freshly ground coffee is subjected to water either at boiling temperature or slightly below such temperature, a foaming ensues and gas bubbles are formed and liberated. After this gas has been liberated from the ground coffee, the ground coffee settles, and soluble substances in the coffee are exposed to the action of the hot water, and are more or less easily dissolved. The finer the grind of coffee the more quickly the soluble substances are dissolved, although if too fine a grind is used, there is a tendency to give the coffee beverage a bitter and woody taste.

All of the water which contacts the coffee should be just below the boiling temperature, that is, from 205° to 210°. Even if the water were boiling at 212°, it loses a few degrees on contacting the coffee, and a further reduction is caused by the absorption of heat by the infusing receptacle holding the ground coffee. The first water contacting the coffee should not be the hottest in order to allow a gradual liberation of the gases and also in relatively small quantities to allow the grounds to become soaked and expanded and left in a position to readily give up the soluble oils upon the subsequent passage of the water through them and just below the boiling point.

The time of the hot water contacting the coffee will vary with the grind of coffee. If the grind is almost pulverized, the desired amount of extraction can be secured in from 2 to 3 minutes. However, if a medium grind is used, the desired extraction can be secured in from five to seven minutes, if all the water is passed through the coffee at correct temperature.

Another important factor in the making of coffee is to maintain the beverage at serving temperature, 180° to 190°, not allowing the beverage to become cool necessitating reheating, or boiling after it has been made. The coffee beverage should be maintained in a serving receptacle which is not affected by the coffee beverage and one which is easily cleaned.

The coffee beverage should be free from grounds after the coffee making process has been completed, as these spent grounds continue to act chemically on the beverage and after a time give the beverage a bitter disagreeable taste.

In my apparatus there are three distinct units, one, means for heating and delivering the infusing liquid, two, the infusing receptacle for holding the ground coffee, and three, the container or beverage receptacle for dispensing the beverage.

In the accompanying drawings, I have illustrated in considerable detail a practical embodiment of my invention. These drawings, however, are illustrative, merely, so that those skilled in the art may understand the construction and operation of my device. It is expressly understood that I do not limit myself to the details of construction herein shown and described as my invention may be embodied in a great variety of forms, differing from the example herein given, but without departing from the scope of the invention as defined in the appended claims.

The most important principle of the invention, is the method of heating the water and transferring it to the infusing receptacle.

The broad principles involved are the creating of a vapor, gas or steam pressure on the top surface of the water in the tank which causes the water in the tank to attempt to escape due to this pressure, and to provide an outlet for this water, but before this water is allowed to be transferred to the infusing receptacle, it is heated to infusing temperature by means of a heating unit.

The creating of the gaseous pressure on the top surface of the liquid can be accomplished by application of heat to the heating chamber in any suitable manner, either by heating means applied to the bottom surface of the heating chamber or by an immersion heating unit placed in the water in said chamber.

1. If the heating chamber is filled almost or to capacity, leaving only a small amount of air space above the water in the chamber, or no air space at all, and the pressure produced on the top surface of the water is derived solely from the vapor or steam rising from the top surface of the liquid, that is, heating the mass of water as a whole, a sufficient gaseous pressure is not created to cause the water in the chamber to be delivered to the infusing receptacle, until the temperature of the mass of water is near the boiling point, and when this period is reached the gaseous pressure is developed so rapidly that it causes the transfer of all the water to the infusing receptacle in an extremely short time. This method would be satisfactory if an almost pulverized coffee were used, together with a filtering medium such as filter paper or cloth.

2. If, on the other hand, the heating chamber was only partially filled with water, leaving a large amount of air space in the chamber above the surface of the water, and the pressure produced on the top surface of the water is derived solely from the vapor or steam rising from the top surface of the liquid, the air or vapor in the large space at the top of the heating chamber would expand so rapidly that the water transferred to the infusing receptacle would be at too low a temperature to make a satisfactory coffee infusion.

The application of the broad principle of my invention is to create a gaseous pressure on the top surface of the liquid in Example 1 above, without depending on the pressure to be created solely from the vapor gas or steam arising from the top surface of the water or liquid. This is accomplished in the present construction by having a tube which extends above the top surface of the water in the heating chamber, even if the chamber is filled to capacity. The water around the heating unit is quickly heated and steam is created causing the water and steam or vapor to rise in the pressure tube and be liberated on the top surface of the water. As this continues, the pressure on the top surface of the water is sufficient to cause a movement of the water to the infusing receptacle, independent of the temperature of the mass of water as a whole. Any desired results can be secured by varying the ratio of the heating means applied to creating the pressure on the top surface of the water, so that the water may be started in its delivery to the infusing receptacle in one minute or in six minutes depending entirely on the results desired. In actual practice, using a full quantity of water, and sufficient amount of heat, the contact of the water commences at the beginning of the sixth minute and continues until twelve minutes when the process is completed. This gives a six minute period of water contact with the ground coffee in the infusing receptacle, securing satisfactory results when using the all-purpose universal or medium grind of coffee.

In order that the water be at the correct temperature for making a satisfactory coffee infusion, it is heated as it is delivered, by passing adjacent to the heating means. In the illustrated drawing the water passes between the hollow member wall and the exterior portion of the heating unit. It passes slowly at first due to the small amount of pressure on the top surface of the water. As the heating unit gets extremely hot, the water cannot pass up the hollow member due to an interior pressure caused by steam in the space between the hollow member and the heating unit. The water then flows up the inlet and by-pass tube and comes in contact with the top portion of the heating unit and the steam from the surface of the heating unit where it is brought up to infusing temperature as it is being delivered to the infusing receptacle.

This is ideal for the making of a coffee infusion, as the coffee is allowed to become soaked and expanded, whereby a plurality of small crevices will appear in the larger particles, and many of the smaller dust-like particles will become lodged in the crevices of the larger particles, thus preventing these small particles from being passed through the walls of the infusing receptacle into the beverage, whereby the resultant or finished coffee will be clear and substantially free of sediment, without the use of filter paper or cloth.

In carrying out the principles of my invention, it is essential that they be applied mechanically in order to secure satisfactory results when making a small quantity or maximum quantity in the same device. Percolators, vacuum glass coffee makers and ordinary drip coffee makers are generally not satisfactory when used for less than full quantity. Therefore, a unit which is satisfactory for a small or large quantity in the same unit is an improvement over present existing coffee making devices.

If, in making a maximum quantity of a satisfactory coffee infusion, the water used be at correct temperature and the time of contact of the water with the ground coffee a definite time (six minutes), then in making one-half such maximum quantity, the water must also be at the same correct temperature and the time of contact with the ground coffee, the same definite time (six minutes). If this is accomplished, the coffee beverage will be the same, whether a small or maximum quantity is made.

To accomplish these desired results, it is necessary to so construct the heating means and position it in relation to the infusing liquid (water) that although the pressure on the top surface of the liquid, when making a small quantity is sufficient to cause the water to pass to the material receptacle, and the heating means is sufficient to heat the water to correct temperature, that the water is delivered to the infusing receptacle in approximately the same time as the maximum quantity, that is six minutes.

The desired results could be secured by introducing a valve in the delivery tube so as to regulate the flow of the water therethrough. This, however, adds an adjustment feature which may be forgotten by the operators, and the results should be automatic as to time of water contact with the material in the infusing receptacle. These results are accomplished in my invention by placing the heating means (heating unit) in the center of the water, the top of the heating unit being approximately on-half of the distance from the top of the heating chamber to the bottom thereof. When a full quantity is made approximately ½ of the water is above the heating unit. When ½ quantity is made, the top surface of the water is about level with the top of the heating unit.

In the accompanying drawings which illustrate a practical embodiment of my invention:

Fig. 3 is a view in central vertical section with small portions broken away.

Fig. 4 is a view in vertical section on the line 4—4 of Fig. 3.

Fig. 5 is a view in horizontal section on the line 5—5 of Fig. 3 on a reduced scale.

Fig. 6 is a view in horizontal section on the line 6—6 of Fig. 3 looking upwardly.

Fig. 7 is a view in horizontal section on the line 7—7 of Fig. 3.

Fig. 8 is a view in horizontal section on the line 8—8 of Fig. 3.

Figure 1:
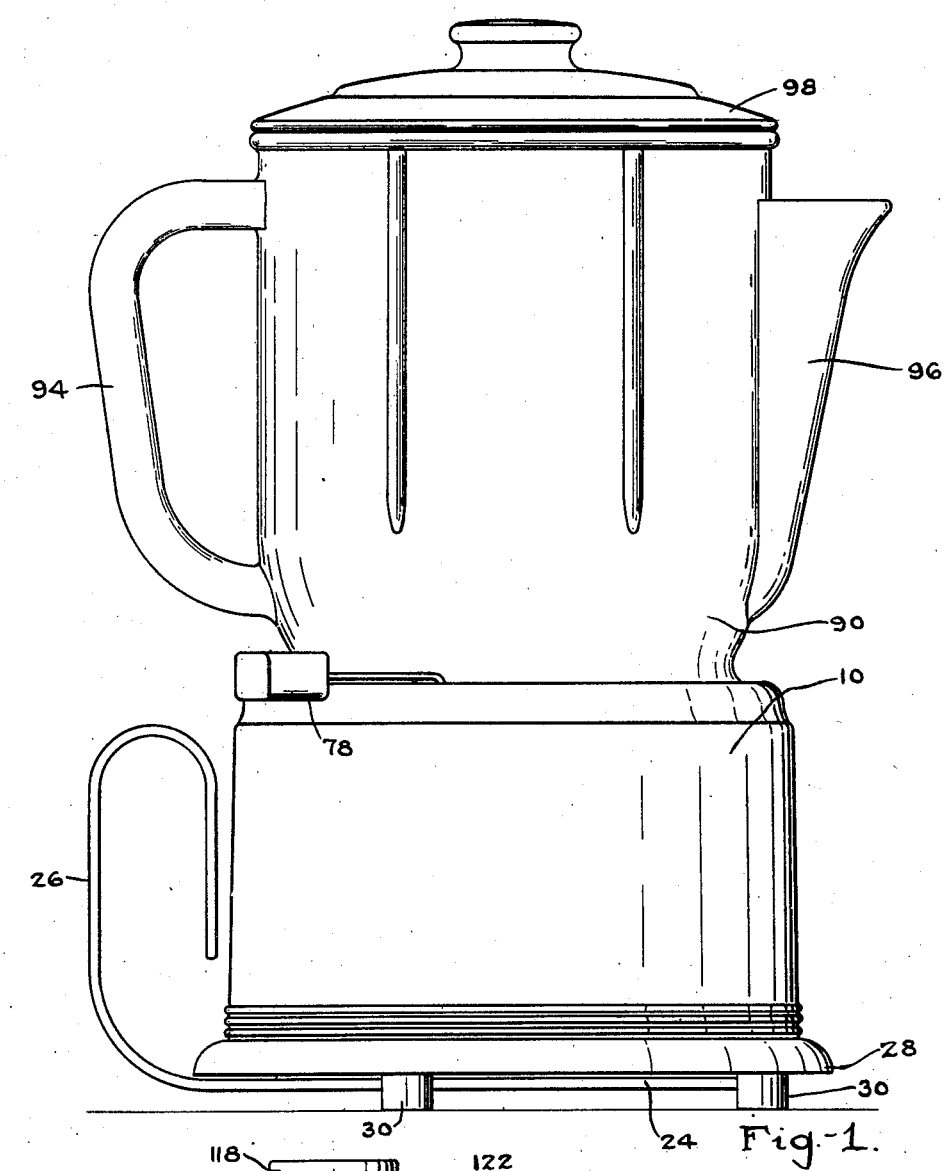
Fig. 1 is a side elevational view of the apparatus in assembled condition.
Figure 2:
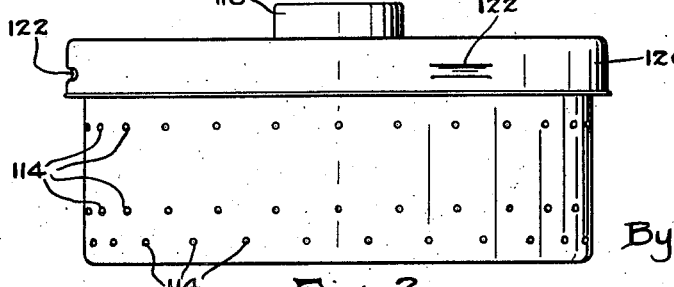
Fig. 2 is an elevational view of an infusing receptacle when removed from the remainder of the apparatus.

Referring to the particular construction shown in the drawings for illustrative purposes, it will be seen that I provide a casing 10 forming a heating chamber 12 for the infusing liquid and provided with a bottom member 14 brazed to the side wall of the casing. This side wall is extended below the member 14 and has secured thereto angle members 16. Secured to the lower portions of the angles 16 are an insulating disk 18 and an underlying metal disk 20. Secured to the underside of the disk 20 are an insulating disk 22 and an underlying member 24 which at one side is extended and curved upwardly to provide a handle 26 for the casing 10. It will be noted that the lower edge of the casing 10 is bulged outwardly at 28 to encircle the edge of the disks 18 and 20. Feet 30 are secured to the lower side of the disk 20.

The bottom member 14 is annular and the central portion thereof is swaged downwardly to provide a shallow well 32. Brazed to the edge of the opening in the annular member 14 is the lower end of the shell of an electrical heating unit 34 containing a coil included in a supply wire 36, the end of which is attached to a binding post 38 as shown in Fig. 6. This binding post is carried by a bracket 40 which extends down from the bottom 14. The bracket 40 also carries a binding post 42 to which is attached a return wire 44. The binding post 42 carries a contact member 45, the position of which may be adjusted by a screw 46 insulatively carried by the post 42. The post 38 carries a spring finger 48, the free end of which is provided with a contact 50 normally engaging the contact 45. The post 38' also carries a thermostatic bar 52. When this bar is sufficiently flexed by heat, its free end engages the finger 48 to break engagement of the contact 50 with the contact 45. It will be noted from Fig. 3 that the heating unit 34 extends up from the well 32 for about half the height of the heating chamber 12.

The casing 10 has an upper annular wall 54 whose central portion is swaged downwardly and then upwardly to provide a vertical flange 56 surrounding the central opening in the wall 54. The flange 56 is provided with a number of outward projections 58 as shown in Fig. 7 which are adapted to be engaged by a corresponding number of inward projections 60, carried by the downwardly extending peripheral flange 62 of a cover 64. This cover is also annular and has at its central portion an upwardly extending flange to which is brazed the intermediate portion of a short tube 66. This tube has an outwardly struck portion 68 which holds in place an asbestos collar 70 and a surrounding conical rubber sealing member 72 whose lower end rests upon asbestos gaskets 74, the number of which may be increased or decreased so that the sealing member 72 will be adjusted up or down for a purpose which will appear later. The cover 64 has a groove containing a sealing ring 76 adapted to rest upon the upper end of the circular flange 56. The cover 64 is also provided with a locking lever 78 by which this cover may be turned to engage the locking projections 58 and 60. When these projections are disengaged, the whole structure shown in Fig. 4 may be removed upwardly. This structure includes a hollow member 80 brazed to the lower portion of the tube 66 and open at its lower end. Brazed to one side of the hollow member 80 is an inlet and by-pass tube 82 whose lower end opens outside the member 80 so as to come at about the top of the wall 32. The upper end of this tube opens into the upper portion of the member 80. Brazed to another side of the member 80 is a pressure tube 84 whose lower portion opens inside the member 80 and whose upper end opens outside the member 80 toward the upper end of the chamber 12. The tube 66 above the hollow member 80 is provided with one or more small perforations 86, there being two of them as shown in Fig. 3 diametrically opposite with a pin 88 passing loosely therethrough to remove lime and other deposits. When the member 80 is in place it surrounds the heating unit 34 with an intervening space 89.

A beverage receptacle 90 has a re-entrant portion 92 in its bottom adapted to fit over the sealing member 72 which makes a tight seal therewith. By varying the number of gaskets 74, the bottom of the receptacle 90 may be properly spaced above the top 54 of the heating chamber 12. The receptacle 90 is made of suitable refractory material which may be china-ware and has a handle 94, a pouring spout 96, and an upwardly concave cover 98. The re-entrant portion 92 is centrally perforated in order that the lower end of a delivery tube 100 for infusing liquid may be secured therein. In order to do this, the lower end of the delivery tube 100 is threaded for receiving nuts 102 and 104 placed respectively above and below the re-entrant portion 92 with interposed gaskets 106 and 108. The upper end of the tube 100 extends up to about the top of the receptacle 90 and is beveled on its outside to receive the upper end of a tapered sleeve 110 whose lower end is crimped to the material surrounding an opening in the bottom of an infusing receptacle 112. The side wall of the receptacle 112 is provided with a number of small perforations 114 arranged at different levels. The receptacle 112 is provided with a locking cover 116 which at its central portion has an upward bulge 118 to provide space above the upper end of the delivery tube 100. The cover 116 at its periphery has a depending flange 120 provided with inward projections 122 adapted to engage outward projections 124 on the upper portion of the side wall of the receptacle 112 and thus lock the cover in place when it is rotated. The tube 100 contains a small ball 126 adapted to travel between a lower stop 128 and an upper stop 130 to remove lime and other deposits. The tubes 82 and 84 may similarly contain balls 83 and 85. In case it is desirable to use filter paper or cloth, the perforations 114 should be in the bottom instead of the side wall of the receptacle 112.

The operation and advantages of my invention will be understood from the foregoing description. The heating hollow member 80 is arranged, as illustrated in the drawings, so that the exterior surface of the heating unit is not in direct contact with the walls of the hollow member which allows water and steam to pass between the heating unit and the hollow member.

When a small quantity is made, while the expansion of the air on the top surface of the water, together with the steam and vapor from the tube 84, is sufficient to deliver the small quantity of water in the heating chamber 12 to the infusing receptacle 112, as the water is caused to flow through the space 89 around the heating unit 34 and up the tube 82, it comes in contact with the extremely hot surface of the heating unit and a portion is quickly converted into steam.

This causes a decided movement of the water and steam inside of the hollow member 80, part of this pressure inside of the hollow member causes a portion of the water and steam to be delivered to the infusing receptacle 112, and the balance of this pressure causes the water and steam to deliver downwards into the mass of water as a whole, with a portion being delivered up the tube 84 onto the top surface of the water. Immediately after this happens, the space 89 and the tube 82 are both substantially free from water.

During the period the water and steam is being forced downwards in the hollow member 80 and tube 82, the pressure on the top surface of the infusing liquid in the heating chamber has not any way of being lessened. In fact this pressure is increased by steam and vapor coming up the pressure tube 84, and the vapor from the surface of the water. The pressure then gets to the point where it causes the water to move up the space 89 and up the by-pass tube 82, and the intermittent process is repeated.

The result of this delayed intermittent action, when a small quantity is made, is that the vapor pressure on the top surface is relatively increased out of proportion to the pressure needed to lift the water in the heating chamber to the infusing receptacle 112. As the water is delivered at correct infusing temperature, and due to the delayed intermittent charges of water delivered to the ground coffee, the time of water in contact with the ground coffee is approximately the same (six minutes) as when making a maximum quantity. The resulting coffee beverage cannot be distinguished from the beverage resulting from a full quantity, as the essential factors, time and temperature, have been uniformly carried out, in co-operation with the especially constructed infusing receptacle.

But this arrangement of the hollow member 80 in relation to the heating means (heating unit) does not cause the delayed intermittent action when making a full quantity as the heating means is relatively smaller in proportion to the larger mass of water. Further, when making more than one-half quantity, the water is above the heating means and the amount of the air space is proportionately reduced. By this construction, when making a small quantity, one-half or less, the intermittent action is very pronounced. As larger quantities are made, the intermittent action is reduced proportionately so that when making a full quantity, as the water is delivered to the infusing receptacle it runs almost in an uninterrupted stream.

By mechanical arrangement, any desired results can be secured in carrying out the principles of my invention as to temperature of the delivered infusing liquid, the time desired for the infusion, that is, time of contact of the infusing liquid with the material to be infused, and also to accomplish the same results in a given capacity unit or device, whether a full quantity or small quantity is made.

While one heating unit is used, it performs four functions during the process of making coffee, (1) heating the mass of liquid, (2) creating a pressure on the top surface of the liquid, (3) heating the infusing liquid as it is being delivered, (4) causes a delayed delivery period when making a small quantity.

It does not follow, that such heating means must perform all of these four functions at one time. Any function may be performed coupled with one or more of the other functions independently or combined in any combination to carry out the principles of my invention. Furthermore, the same heating means after the coffee making process has been completed, acts as maintenance unit to keep the heating chamber 12 at a sufficient temperature to maintain the coffee beverage at serving temperature.

My invention differs from the so-called vacuum method of making coffee in that the water is heated as it is delivered and that the heating chamber for the water is separate and distinct from the receptacle for the coffee beverage. My invention differs from percolators inasmuch as the heating chamber for the water is not the same chamber as for the coffee beverage and also that the water passes through the ground coffee only once, and that the coffee beverage does not come in contact with the heating unit. My invention differs from the ordinary drip coffee makers in that the water passes through the coffee at higher temperatures and in reverse proportions, that is, a small amount of water at first and a relatively larger amount during the later stages and in addition that the hottest water to pass through the coffee is during the final stage of the coffee making process and not at the beginning. Other differences will be apparent from the general description.

The infusing receptacle 112 is so constructed that all of the infusing liquid (water) coming into this receptacle will pass through the material to be infused (coffee). The cover 116 is held in place by means of a locking device so that the water does not escape between the top surface of the receptacle and the under surface of the cover.

As the water passes up the tube 100 it flows to the center of the bottom of the receptacle 112. It must pass through the coffee to the outside walls before it reaches the perforations in the side walls. When the water comes with force or steam pressure, it hits the top surface of the cover and is forced downwards through the center of the coffee.

As the infusing receptacle 112 is relatively proportioned so that the height is approximately the same distance as one-half the diameter, all of the water introduced into the center of the receptacle must travel about equal distance through the ground coffee, and a thorough extraction is secured. The perforations are placed in the side walls of the receptacle so that the same extraction result can be secured when making a small quantity as a maximum quantity. As the oils and solids are dissolved, they are washed to the side walls and the last almost boiling water causes these oils and solids to be passed through the perforations into the beverage. Due to the force that the water is introduced into the infusing receptacle, the ground coffee is subjected to a constant movement causing a complete saturation of all portions of ground coffee. Thus channeling does not occur as is often the case in many drip coffee makers.

At the end of the coffee making process, steam and not air is liberated from the tube 100 which causes most of the oils, solids and moisture to be driven from the infusing receptacle and the grounds become substantially dry. The result is that the infusing receptacle does not continue to drip, as in the case of percolators and further because the top of the infusing receptacle is closed, the condensation from the top cover of the beverage receptacle cannot drip and pass through the spent coffee grounds. The bottom of this receptacle is closed so that coffee fumes cannot enter to cause a continued action on the spent coffee grounds. This construction is of importance commercially because the infusing receptacle does not have to be removed to prevent the spoiling of the finished coffee beverage by drippings from the coffee grounds.

The infusing receptacle 112 merely rests on the tube 100 at its upper end. The tube 100 is tapered so that the receptacle fits closely and all the water coming up the tube 100 is caused to enter the infusing receptacle.

The perforations in the side walls of the infusing receptacle are few in number, so that it takes pressure to force the water through the ground coffee. If these holes plug up to any extent retarding the flow of the water through the ground coffee, the water cannot leave the top of the tube 100. As the water is then held back, the pressure in the heating chamber increases until the pressure is sufficient to force the water through the ground coffee. It is for this reason that the number of holes in the infusing receptacle is smaller in number than in ordinary drip pots where the water passes through the ground coffee by gravity only.

As the infusing receptacle is held in place only by gravity, it acts as a safety valve. If the pressure in the heating chamber should become excessive, it would merely lift the infusing receptacle from the tube 100 and the pressure would be released.

The infusing receptacle is constructed in direct relationship with the heating means, so as to balance the rate of flow of water up the tube 100 when making substantially a full quantity in order that the desired temperatures and time of water contact may be secured, without the necessity of making any mechanical adjustments when making different quantities of coffee beverage.

As the hollow member 80 is constructed so that its bottom is flush with the bottom of the heating chamber at position 32 and the bottom of tube 82 is also flush with the bottom of the heating chamber, all of the infusing liquid (water) in the heating chamber is delivered to the infusing receptacle. The heating chamber then becomes empty and free from liquid.

The thermostat is so placed in contact with the bottom of the heating chamber as to readily react to the temperature of this bottom. It may be set so as to cut out the electric current to the heating means, either before the infusing operation has been completed or at any temperature after the infusing operation has been completed.

If the function of the thermostat was only to cut off the heating means when a sufficient heat had been applied to complete the infusing process, the thermostat would be set to cut out before the infusing process had been completed. The heating chamber after the infusing process has been completed acts as an electric heater. Under such conditions the thermostat does not cut off the heating means until a temperature is reached for the heating chamber, which will maintain the finished coffee beverage at a serving temperature when the beverage receptacle is left in contact with the top surface of the heating chamber.

As a loss in temperature occurs in the heating chamber, the thermostat makes the electrical contact, and the heating means again functions, until the desired temperature is again secured. In this manner the heating chamber is maintained at a sufficient temperature to keep the beverage at correct serving temperature. The above function is the fifth function performed by one heating means.

In order to control the movement of the infusing liquid (water) when making a small quantity, the vapor pressure on the top surface of the water is regulated by means of one or more holes 86 in the tube 66. When the water level is below the holes 86, the air in the space and the gaseous pressure is allowed to escape through these holes, thereby delaying the movement of the water past the heating means. As soon as the gaseous pressure is too great to be all liberated through the holes 86, the water moves past the heating means to the infusing receptacle. The size of the hole or holes is determined by the pressure desired on the top surface of the liquid and the temperature of the delivered infusing liquid. The pin 88 is placed through the hole 86 and held in place and as the water passes the pin, it causes it to constantly move, keeping the holes free from lime and other deposits.

The position of these holes, whether near the top of the heating chamber, or lower depends upon the relative ratio of the heating means to the maximum capacity of the heating chamber and the relative position of the hollow member 80 to the heating means.

The heating means (heating unit) is constructed so that the water passes the exterior curved surface thereof rather than through a center hole in a heating unit, in order that any lime deposits on the surface of the heating unit will break off due to expansion and contraction of the metal of the heating unit. As the mass of water as a whole never boils, very little lime and other substances are deposited on the inside walls of the heating chamber.

The hollow member 80 is attached to the locking cover 64 and as it is removed every time liquid is introduced into the heating chamber 12, it can be easily cleaned if necessary. Furthermore when the locking cover 64 is removed, the heating chamber is open at the top and is subject to the air, which keeps it ventilated and free from odors.

As all of the water is forced out of the heating chamber, this chamber becomes dry and if ventilated does not need to be cleaned or washed as the heating chamber is subjected only to water, not coffee as in percolators. Furthermore, the lime deposits on the surface of the heating unit as they break off are carried by the water up the hollow member 80 and by-pass tube 82 and the delivery tube 100 into the ground coffee in the infusing receptacle and do not pass into the finished beverage. In this respect, the heating chamber is practically self-cleaning.

As lime and mineral deposits occur in restricted places when temperatures are excessive and where increases and decreases in temperature occur, a stainless steel ball 126 is placed in the delivery tube 100 and is prevented from coming out by pins 128 and 130. During the coffee making process the ball moves up and down in the delivery tube keeping the tube free from all deposits.

When the coffee making process has been completed, the beverage receptacle 90 is removed. The locking cover 64 is rotated and the structure in Fig. 4 is removed. The beverage receptacle is then set on the heating chamber 12. This removes the gasket 76 and the sealing member 72 from continuous contact with the hot heating chamber.

I claim:

1. In apparatus for making infusions, the combination of a chamber for infusing liquid, a receptacle for holding the material to be infused, means for delivering the liquid in a stream to said receptacle by utilizing gaseous pressure on the top surface of the liquid in said chamber, and a heating means for producing said gaseous pressure and for heating said stream to infusing temperature as it is being delivered.

2. In apparatus for making infusions, the combination of a heating chamber for infusing liquid, a receptacle for holding the material to be infused, means for delivering the liquid to said receptacle by utilizing gaseous pressure produced in said heating chamber, heating means associated with said chamber and said delivering means for producing said gaseous pressure and for heating said liquid to infusing temperature as it is being delivered, and means for automatically causing the infusing liquid to be delivered in substantially the same time for varying quantities of the infusing liquid.

3. In apparatus for making infusions, the combination of a chamber for infusing liquid, a receptacle for holding the material to be infused, means for delivering the liquid in a stream to said receptacle by utilizing gaseous pressure on the top surface of the liquid in said chamber, and a heating means for converting small portions of the infusing liquid into said gaseous pressure and for heating said stream to infusing temperature as it is being delivered.

4. In apparatus for making infusions, the combination of a heating chamber for infusing liquid, a receptacle for holding the material to be infused, heating means associated with said chamber to heat the mass of liquid therein and to create a gaseous pressure on the top surface of said liquid, means for delivering the liquid to said receptacle by utilizing the pressure produced in said heating chamber, means for causing the heating means to raise the liquid to infusing temperature as it is being delivered, and means for causing the heating means to automatically retard the delivery of the infusing liquid when using less than maximum quantity of infusing liquid.

5. In apparatus for making infusions, the combination of a heating chamber for infusing liquid, a heating means associated with said chamber, means for causing the heating means to convert small portions of the infusing liquid into a gaseous pressure on the top surface of the liquid in said chamber, a receptacle for holding the material to be infused, and means for causing the liquid to flow by gaseous pressure past the heating means for raising small portions of the liquid to infusing temperature as it is being delivered to said receptacle.

6. In apparatus for making infusions, the combination of a chamber for infusing liquid, a receptacle for holding the material to be infused, means for delivering the liquid in a stream to said receptacle by utilizing gaseous pressure produced in said chamber, a heating means for producing said gaseous pressure and for heating said stream to infusing temperature as it is being delivered, and means for automatically controlling the rate of flow of infusing liquid to said receptacle.

7. In apparatus for making infusions, the combination of a chamber for infusing liquid, a receptacle for holding the material to be infused, means for delivering the liquid in a stream to said receptacle by utilizing gaseous pressure produced in said chamber, a heating means for producing said gaseous pressure and for heating said stream to infusing temperature as it is being delivered, and means for automatically controlling said gaseous pressure and the rate of flow of said stream.

8. In apparatus for making infusions, the combination of a chamber for infusing liquid, a filtration receptacle for holding the material to be infused, means for delivering the liquid in a stream to said receptacle by utilizing gaseous pressure produced on the top surface of the liquid in said chamber, a heating means for producing said gaseous pressure and for heating said stream to infusing temperature as it is being delivered, and a beverage receptacle adapted to be supported upon said chamber for receiving the infusion from said filtration receptacle, said beverage receptacle being removable for dispensing the beverage.

9. In apparatus for making infusions, the combination of an open top container, means for releasably sealing said open top to provide a chamber for infusing liquid, a filtration receptacle for holding the material to be infused, means for delivering the liquid in a stream to said receptacle by utilizing gaseous pressure produced on the top surface of the liquid in said chamber, a heating means for producing said gaseous pressure and for heating said stream to infusing temperature as it is being delivered, and a beverage receptacle adapted to be supported upon said chamber for receiving the infusion from said filtration receptacle, said beverage receptacle being removable for dispensing the beverage.

10. In apparatus for making infusions, the combination of a heating chamber for infusing liquid, an electric heating unit at the lower portion of said chamber, a hollow member spaced around said unit and open at its lower end, means for supplying gaseous pressure on the top surface of the liquid in said chamber, a receptacle for holding the material to be infused, a tubular connection extending from the upper portion of said hollow member to said receptacle for delivering thereto the liquid at infusing temperature which has been forced past said heating unit by said gaseous pressure, and an inlet and by-pass tube opening at its lower end outside of said hollow member and opening at its upper end into said hollow member.

11. In apparatus for making infusions, the combination of a heating chamber for infusing liquid, an electric heating unit in said chamber, a hollow member spaced around said unit and open at its lower end, a pressure tube extending from said hollow member to the upper portion of said chamber for supplying gaseous pressure on the top surface of the liquid in said chamber, a receptacle for holding the material to be infused, means for delivering to said receptacle the liquid at infusing temperature which has been forced past said heating unit by said gaseous pressure, said delivering means being perforated at a place between its lower end and the top of said heating chamber so that when the liquid level in said chamber is below said place, gaseous pressure is allowed to escape by means of said perforation into said delivering means, and an inlet and by-pass tube opening at its lower end outside of said hollow member and opening at its upper end into said hollow member.

12. In apparatus for making infusions, the combination of a chamber for infusing liquid, a receptacle for holding the material to be infused, means for delivering the liquid in a stream to said receptacle by utilizing gaseous pressure produced in said chamber, a heating means for producing said gaseous pressure and for heating said stream to infusing temperature as it is being delivered, a beverage receptacle positioned above said chamber and heated thereby, and a thermostat associated with said heating means arranged to cut off the heat when the temperature in said chamber reaches substantially the point required to maintain the beverage in the beverage receptacle at desired serving temperature.

13. In apparatus for making infusions, the combination of a chamber for infusing liquid, a receptacle for holding the material to be infused, means for delivering the liquid in a stream to said receptacle by utilizing gaseous pressure on the top surface of the liquid in said chamber, a heating means for producing said gaseous pressure and for heating said stream to infusing temperature as it is being delivered, and a thermostat associated with the heating means for controlling the same.

14. In apparatus for making infusions, the combination of a chamber for infusing liquid, a receptacle for holding the material to be infused, means for delivering the liquid in a stream to said receptacle by utilizing gaseous pressure on the top surface of the liquid in said chamber, a heating means for producing said gaseous pressure and for heating said stream to infusing temperature as it is being delivered, and a thermostat associated with the heating means arranged to cut off the heating means at a predetermined temperature of the heat responsive elements of the thermostat and to cut in the heating means when the temperature of said elements falls below the predetermined temperature.

15. In apparatus for making infusions, the combination of a chamber for infusing liquid, a receptacle for holding the material to be infused, means for delivering the liquid in a stream to said receptacle by utilizing gaseous pressure on the top surface of the liquid in said chamber, a heating means for producing said gaseous pressure and for heating said stream to infusing temperature as it is being delivered, said delivery means including a tube, and a movable element in said tube caused to move by passage of liquid therethrough for keeping the interior of the tube free from deposits.

16. In apparatus for making infusions, the combination of an open top container, means for releasably sealing said open top to provide a chamber for infusing liquid, a filtration receptacle for holding the material to be infused, means for delivering the liquid in a stream to said receptacle by utilizing gaseous pressure produced on the top surface of the liquid in said chamber, a heating means for producing said gaseous pressure and for heating said stream to infusing temperature as it is being delivered, a beverage receptacle adapted to be supported above said chamber for receiving the infusion from said filtration receptacle and removable for dispensing the beverage, said delivering means including two tubular members, one of which is carried by said beverage receptacle and the other of which extends into said chamber, and means for coupling said tubular members when said beverage receptacle is in place above said chamber.

HARRY DORR HARPER.